Aug. 7, 1928.

A. J. TOWNSEND 1,680,233

ELECTRIC WELDING METHOD AND APPARATUS

Filed Jan. 18, 1921    3 Sheets-Sheet 2

Inventor
A.J. Townsend
By Freese, Merkel, Saywell and Bond
Attorney

Aug. 7, 1928.
A. J. TOWNSEND
1,680,233
ELECTRIC WELDING METHOD AND APPARATUS
Filed Jan. 18, 1921  3 Sheets-Sheet 3
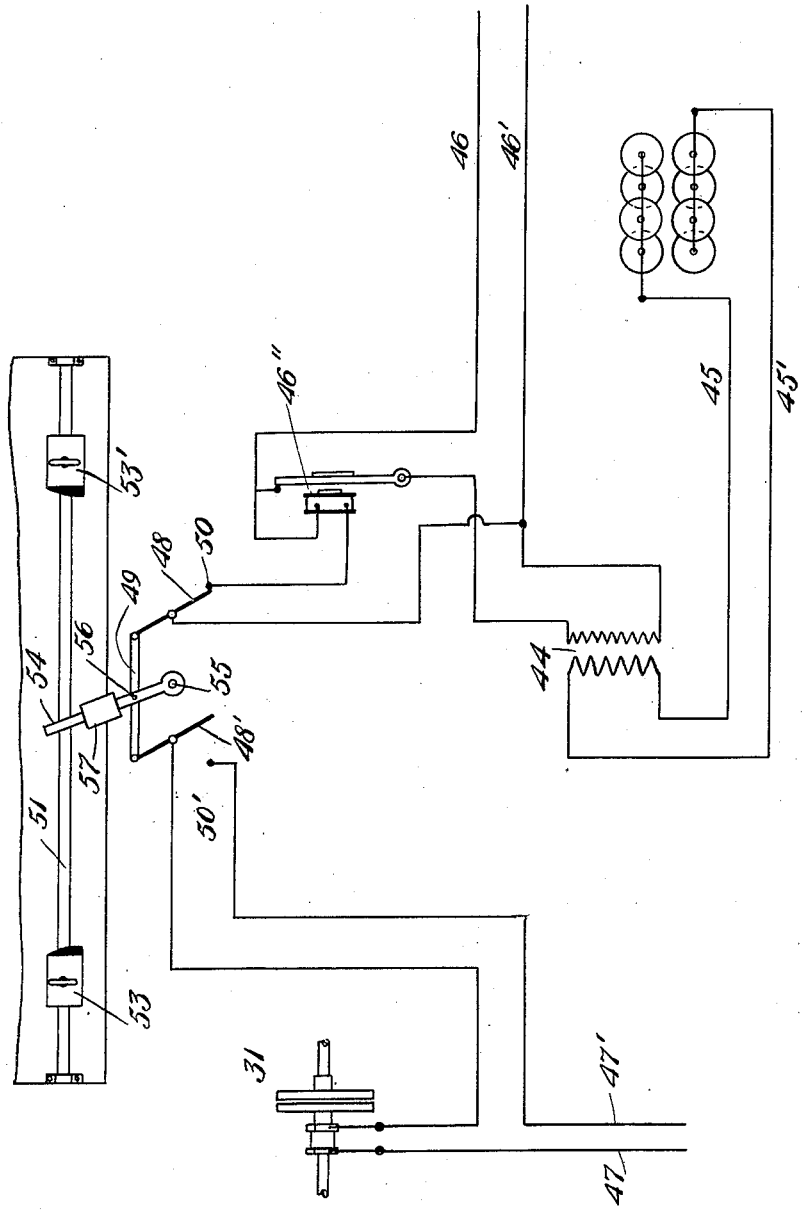
Inventor
A.J. Townsend Patented Aug. 7, 1928.

1,680,233

UNITED STATES PATENT OFFICE.

ARTHUR J. TOWNSEND, OF CANTON, OHIO, ASSIGNOR, BY MESNE ASSIGNMENTS, TO THE COLUMBIA STEEL COMPANY, OF PITTSBURGH, PENNSYLVANIA, A CORPORATION OF PENNSYLVANIA.

ELECTRIC WELDING METHOD AND APPARATUS.

Application filed January 18, 1921. Serial No. 438,126.

The invention relates to a method and apparatus for spot welding metal strips, sheets or plates together, and the object of the improvement is to weld a series of spots during a continuous longitudinal movement of the metal laminæ.

The welding of contiguous sheets or plates in spots surrounded by unwelded spaces may be accomplished by opposing electrodes serving to supply and localize the electric current and the necessary pressure on both sides of the material; and the fact that the current and pressure must be applied for a substantial period of time, complicates the problem of constantly moving the material during the welding of a series of successive spots therein.

The improved process involves the use of means for moving the electrodes under uniform and perpendicular constant pressing contact and in closed circuit with the material during the period of welding, and means for returning the electrodes, preferably in open circuit and with pressing contact relieved or withdrawn, to the initial position for another welding operation upon a succeeding portion of the material.

And the invention, in one of the modes for carrying out the method, may involve the use of disk or roller electrodes mounted in a reciprocating carriage, with means for stopping the disks from forward rotation during the welding movement of the carriage, but leaving them free to roll on the material during the return movement of the carriage.

Such an apparatus may take the form illustrated in the accompanying drawings, forming part hereof, in which—

Figure 1:
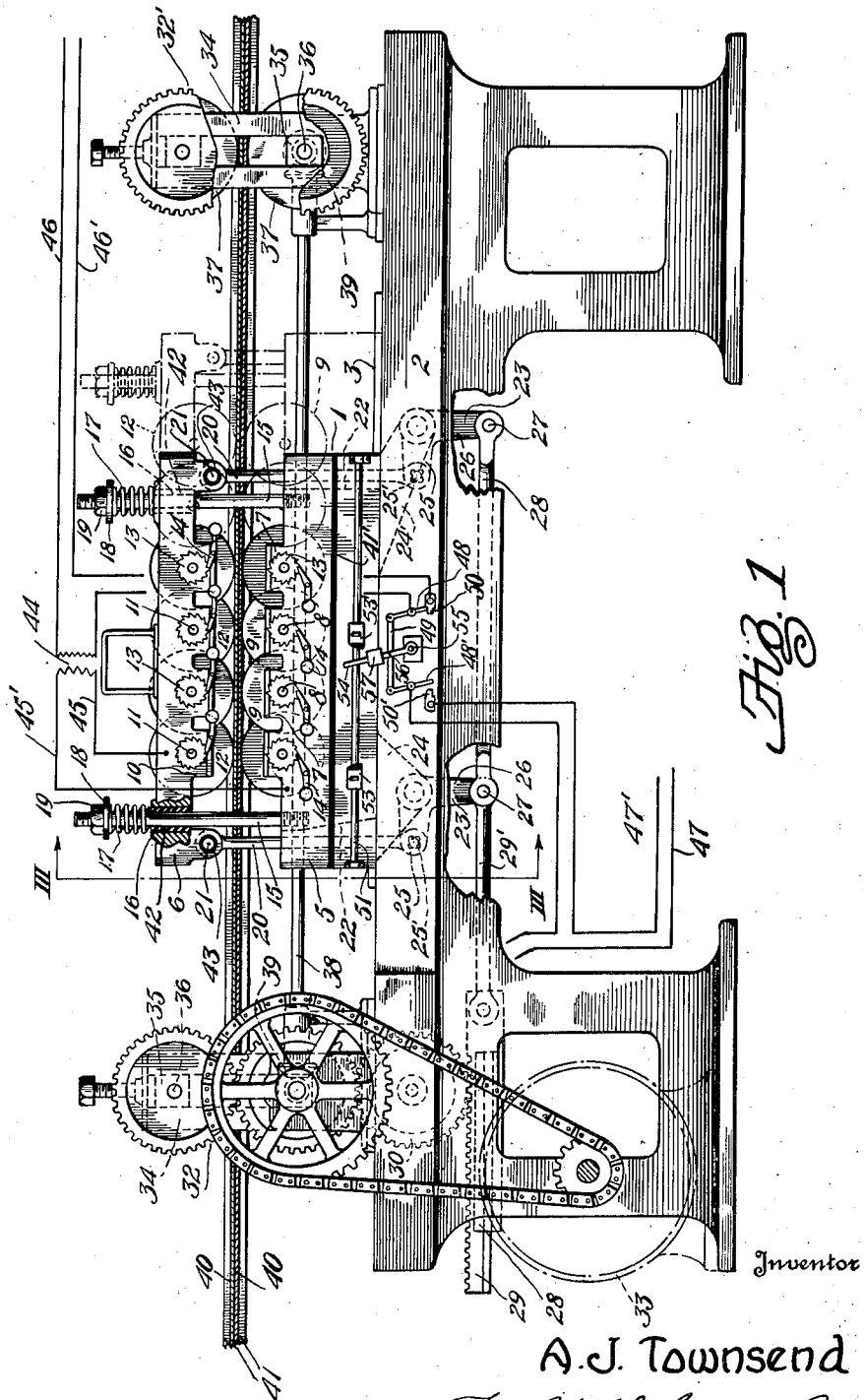
Figure 2:
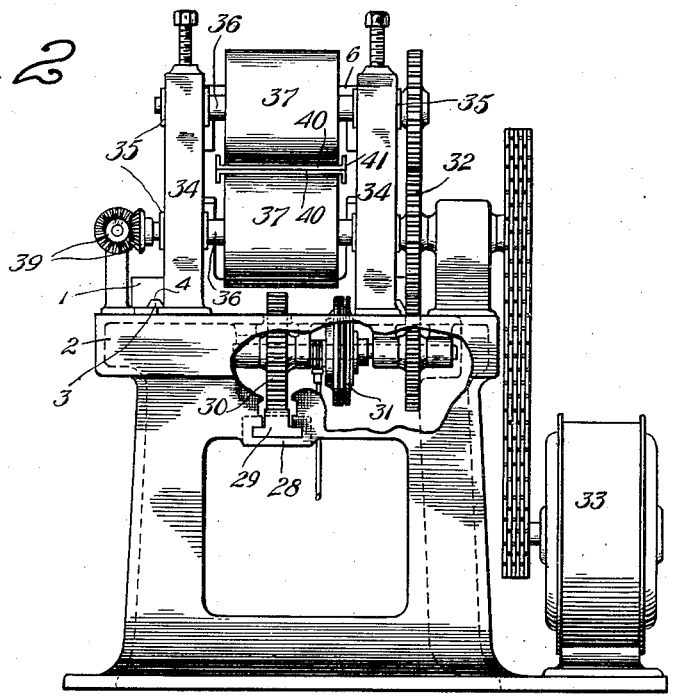
Figure 3:
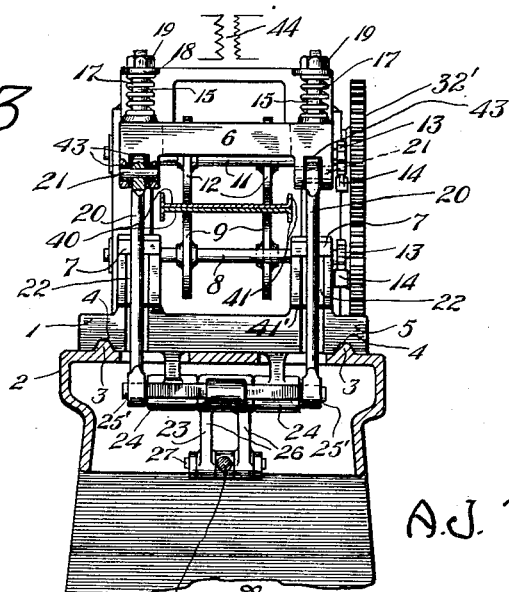

Figure 1 is a side elevation of a reciprocating-carriage disk-electrode form of apparatus;

Fig. 2, an end view of same;

Fig. 3, a transverse section of same on line III—III, Fig. 1; and Fig. 4, a diagrammatic view of the electrical connections and circuits.

Similar numerals refer to similar parts throughout the drawings.

A reciprocating carriage 1 may be mounted upon a table 2 provided with tongues or tracks 3 for entering grooves 4, upon which table and tracks the carriage may slide to and fro endwise upon the table.

The carriage 1 comprises a bottom plate 5 and a top plate 6 upon which are mounted respectively, bearings 7 for shafts 8 for lower disk electrodes 9, and bearings 10 for shafts 11 for upper disk electrodes 12; two laterally spaced sets of coacting disk electrodes being shown arranged in staggered relation in each side of the table.

Means are provided for stopping the disk electrodes from rotating in one direction referred to herein as the forward direction, and such means may be ratchet wheels 13 secured on the ends of the disk shafts, and weighted detents 14 mounted on the sides of the carriage plates, which leave the disks free to rotate in the reverse direction.

The carriage plates are clamped toward each other by means of upright rods 15 secured to the lower plate and rising through apertures 16 in the upper plate, above which top plate each rod is surrounded by a coiled compression spring 17 bearing upon the top plate and adjustably compressed by means of washers 18 and screw nuts 19 on the upper ends of the rods. One clamping rod 15 is preferably located at each corner of the carriage so as to equalize the pressure on each of the four sets of electrodes.

Mechanical means for relieving or withdrawing the pressure of the springs 17 may take the form of pendent links 20 pivotally connected above at 21 to the top plate and passing freely through apertures 22 in the bottom plate of the carriage; and bell-cranks 23 pivotally mounted in ears 24 and 24' depending from the bottom plate of the carriage, each having a horizontal T arm 25 pivoted at 25' to the lower end of two of the pendent links 20, and each having a pendent arm 26 pivoted at 27 to connecting link 28, for coordinating their operation. A longitudinal rack 29 is slidably mounted in a guideway 28 in one end of the table, and is connected by the pitman 29' with the bell-crank at the corresponding end of the table. The rack meshes with a gear wheel 30 operatively connected by a magnetic clutch 31 with a gearing 32 adapted to be continuously driven by a motor 33 or other source of power.

The parts are so arranged that when the electric clutch is thrown out of engagement, the carriage is free to move in forward direction endwise of the table 2 (from the left to the right as shown in Fig. 1), with the upper and lower plates clamped toward each other by the full force of the springs 17; and that when the magnetic clutch is thrown into engagement, the rack gear serves to move the carriage 1 in rearward direction on the table 2, (from the right to left as shown in Fig. 1), and the resistance to this movement acts through the bell-cranks and the connecting rods to relieve or withdraw the pressure of the springs 17 and the clamping action of the rods 15.

Standards 34 are secured on each side at each end of the table 2 in which are mounted bearings 35 for the shafts 36 of feed rolls 37, the rolls at one end being adapted to be continuously driven by the gearing 32 and the motor 33, and the rolls at the other end may be driven through like gearings 32′ by means of the countershaft 38 and beveled gears 39.

The parts are so arranged that long strips, sheets or plates which are to be welded together, may be continuously moved endwise by the feed rolls, and in so doing will pass between the opposing disk electrodes of each set mounted in the carriage, as well shown in Fig. 1; and the described construction and operation of the carriage permits the successive welding operations to proceed without stopping the continuous movement of the metal laminæ.

The metal laminæ to be welded may be the webs 40 of reversely flanged channels 41 made of pressed steel strips, designed to be secured together for making an I-beam member known commercially as steel lumber, as well shown in longitudinal section in Fig. 1, and in end view and transverse section in Figs. 2 and 3; and there is no limit to the character, width or length of strips, sheets or plates which may thus be moved longitudinally for the welding operation, excepting only as the same may be limited by the width and spacing of the feed rolls and the standards, which may be varied in accordance with the dimensions of the material to be welded.

The bearings 7 for the lower disks are preferably insulated from the bottom plate 5 of the carriage, as by the insulation lamination 41′; the top plate and bearings for the upper disk electrodes are preferably insulated from the clamping rods 15, as by the insulation sleeve 42; and the pendent links 20 are preferably insulated from the top plate 6, as by the insulation 43.

The upper and lower electrodes are placed in the secondary circuit of a transformer 44 by means of a conductor 45 communicating with the bearings for the upper disks and the conductor 45′ communicating with the bearings of the lower disk electrodes; which transformer 44 may be suitably mounted on the top plate of the carriage, and the primary circuit of the transformer is connected with a source of alternating current supply by means of conductors 46 and 46′; it being understood there is located in the circuit a magnetic contactor or switch 46″, as diagrammatically shown in Fig. 4, for handling the required current. The magnetic clutch 31 is placed in a direct current circuit by means of conductors 47 and 47′.

The circuits may be opened and closed for a proper operation of the apparatus by means of two parallel switches 48 and 48′ pivoted intermediate their ends on the side of the table and having a connecting bar 49 coordinating the operation of the switches. One switch 48 and its contact 50 are connected with the alternating current conductors, and the other switch 48′ and its contact 50′ are connected with the direct current conductors, so that the respective circuits can be alternately opened and closed by throwing the switches one way or the other.

Mechanical means for operating the switches may comprise a longitudinal bar 51 having trip blocks 53 and 53′ adjustably mounted thereon, and a lever 54 pivoted at its lower end 55 to the side of the table and pivotally connected intermediate its ends at 56 to the bar 49 connecting the switches, which lever is provided with a weight 57 for holding it on the particular side of its pivotal support to which it may be thrown. The upper end of the lever 54 is located between and in the path of the trip blocks 53 and 53′, which are provided with insulation contacts and operate the switch as follows.

The upper end of the lever is thrown to the left, as shown in Fig. 1, for closing the alternating current circuit during the welding operation, which is accomplished while the carriage moves to the right from the position shown in full lines to the position shown in broken lines in Fig. 1; and just before it reaches the latter position, the block 53 impinges the lever 54 and throws it to the right of its pivotal support, thereby swinging the switches and first opening the alternating current circuit and then closing the direct current circuit. Whereupon the electric clutch acts to operate the rack gearing, which moves the carriage to the left to the initial position shown in full lines in Fig. 1; and just before reaching such position, the block 53′ impinges the lever 54 and throws it to the left of its pivotal support, thereby first opening the direct current circuit which throws the electric clutch out of action and then closing the alternating current circuit for another welding operation.

In the operation of the apparatus, the strips, sheets or plates to be welded together are continuously moved longitudinally from left to right, by the action of the feed rolls 37, and when the carriage is in initial position with the electrodes in closed circuit, clamped against the opposite sides of the material, and stopped against forward rotation, it is evident that the clamping engagement of the disks will give a uniform and perpendicular constant pressure and will move the carriage to the right with the moving material in a plane parallel therewith.

The trip blocks are adjusted so that the trip block 53 will carry the switch lever 54 to the right and automatically open the welding current and close the clutch current at the end of the proper period for the welding operation; and so that the trip block 53' will carry the switch lever to the left and open the clutch current and close the welding current, when the electrodes have moved rearward in position for welding spots properly spaced from the spots previously made; after which the operation is automatically repeated as often as may be necessary for the full length or the successive lengths of the material which is fed to the apparatus.

It is obviously not necessary to have the several sets of electrodes in parallel circuits, for it is evident that each set can well have its own circuit to equalize the current applied to each set when more than one set of electrodes is used.

I claim:—

1. The method of spot welding metal laminæ which consists in continuously moving the material, and moving with the material coacting electrodes in closed electric circuit and in uniform perpendicular constant pressing contact with the opposite sides of the material during the welding period, said electrodes being held from relative movement with the material and in open electric circuit between welding periods.

2. The method of spot welding metal laminæ which consists in continuously moving the material, and forwardly moving coacting electrodes in closed electric circuit and uniform perpendicular pressing contact with opposite sides of the material during the welding period, and then rearwardly moving the electrodes for repeating the welding operation in a succeeding portion of the material.

3. Apparatus for spot welding metal laminæ including electrodes in a welding circuit coacting on opposite sides of the material, means moving the material, and means closing the circuit and clamping the electrodes for moving them with the material under uniform perpendicular pressure during the welding period.

4. Apparatus for spot welding metal laminæ including electrodes in a welding circuit coacting on opposite sides of the material, means continuously moving the material, means closing the circuit and clamping the electrodes for moving them with the material under uniform perpendicular pressure during the welding period, and means opening the circuit and unclamping the electrodes for returning them to initial position.

5. Apparatus for spot welding metal laminæ including electrodes in a welding circuit coacting on opposite sides of the material, means continuously moving the material, means closing the circuit and clamping the electrodes for moving them with the material under uniform perpendicular pressure during the welding period, means opening the circuit and unclamping the electrodes, and means returning the electrodes to initial position.

6. Apparatus for spot welding metal laminæ including rotatable disk electrodes in a welding circuit coacting on opposite sides of the material, means moving the material forward, means closing the circuit and clamping the electrodes for moving them with the material during the welding period and means stopping rotation of the electrodes while moving with the material.

7. Apparatus for spot welding metal laminæ including rotatable disk electrodes in a welding circuit coacting on opposite sides of the material, means continuously moving the material, means closing the circuit and clamping the electrodes for moving them with the material during the welding period, means stopping rotation of the electrodes while moving with the material, and means opening the circuit and unclamping the electrodes for returning to initial position.

8. Apparatus for spot welding metal laminæ including rotatable disk electrodes in a welding circuit coacting on opposite sides of the material, means continuously moving the material, means closing the circuit and clamping the electrodes for moving them with the material during the welding period, means stopping rotation of the electrode while moving with the material, means opening the circuit and unclamping the electrodes at the end of the welding period, and means rolling the electrodes back to initial position.

9. Apparatus for spot welding metal laminæ including means moving the material endwise, a carriage movable parallel with the material, electrodes in a welding circuit on the carriage coacting on opposite sides of the material, means closing the circuit and clamping the electrodes for moving the carriage with the material during the welding period.

10. Apparatus for spot welding metal laminæ including means continuously moving the material endwise, a carriage movable parallel with the material, electrodes in a welding circuit on the carriage coacting on opposite sides of the material, means closing the circuit and clamping the electrodes for moving the carriage with the material during the welding period, and means opening the circuit and unclamping the electrodes for returning the carriage to initial position.

11. Apparatus for spot welding metal laminæ including means continuously moving the material, a carriage movable parallel with the material, electrodes in a welding circuit on the carriage coacting on opposite sides of the material, means closing the circuit and clamping the electrodes for moving the carriage with the material during the welding period, means opening the circuit and unclamping the electrodes and means returning the carriage to initial position.

12. Apparatus for spot welding metal laminæ including means moving the material endwise, a carriage movable parallel with the material, rotatable disk electrodes in a welding circuit on the carriage coacting on opposite sides of the material, means closing the circuit and clamping the electrodes against the material, and means stopping rotation of the electrodes for moving the carriage with the material during the welding period.

13. Apparatus for spot welding metal laminæ including means continuously moving the material endwise, a carriage movable parallel with the material, rotatable disks electrodes in a welding circuit on the carriage coacting on opposite sides of the material, means closing the circuit and clamping the electrodes against the material, and means stopping rotation of the electrodes for moving the carriage with the material during the welding period, and means opening the circuit and unclamping the electrodes for returning the carriage to initial position.

14. Apparatus for spot welding metal laminæ including means continuously moving the material endwise, a carriage movable parallel with the material, rotatable disk electrodes in a welding circuit on the carriage coacting on opposite sides of the material, means closing the circuit and clamping the electrodes against the material, means stopping rotation of the electrodes for moving them with the material during the welding period, means opening the circuit and unclamping the electrodes at the end of the welding period, and means returning the carriage to initial position.

ARTHUR J. TOWNSEND